United States Patent [19]
Jensen

[11] Patent Number: 5,930,407
[45] Date of Patent: *Jul. 27, 1999

[54] SYSTEM AND METHOD FOR EFFICIENTLY GENERATING CUBIC COEFFICIENTS IN A COMPUTER GRAPHICS SYSTEM

[75] Inventor: Philip E. Jensen, Bellvue, Colo.

[73] Assignee: Hewlett-Packard Co., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/742,195

[22] Filed: Oct. 31, 1996

[51] Int. Cl.⁶ .............................. G06K 9/32; G06K 9/64; G06F 15/316

[52] U.S. Cl. .......................... 382/300; 382/279; 382/293; 382/295

[58] Field of Search .................................... 382/279, 293, 382/300, 291, 292

[56] References Cited

U.S. PATENT DOCUMENTS

| | | | |
|---|---|---|---|
| 4,578,812 | 3/1986 | Yui | 382/300 |
| 4,703,353 | 10/1987 | David | 382/300 |
| 5,048,105 | 9/1991 | Adachi | 382/300 |
| 5,054,100 | 10/1991 | Tai | 382/300 |
| 5,125,042 | 6/1992 | Kerr, et al. | 382/300 |
| 5,257,326 | 10/1993 | Ozawa et al. | 382/300 |
| 5,481,275 | 1/1996 | Mical et al. | 345/132 |
| 5,537,517 | 7/1996 | Wakabayashi et al. | 395/115 |
| 5,579,418 | 11/1996 | Williams et al. | 382/300 |
| 5,670,981 | 9/1997 | Jensen | 345/118 |

FOREIGN PATENT DOCUMENTS 0182237  5/1986  European Pat. Off. ........ G06F 15/62

OTHER PUBLICATIONS

Maeland "On the Comparison of Interpolation Methods", IEEE, pp. 213–217, Sep. 1988.

George Wolberg, "Digital Image Warping", IEEE Computer Society Press, 1990, pp. 129–161.

Primary Examiner—Bipin H. Shalwala

[57] ABSTRACT

A computer graphics system interpolator for generating pixel values in a destination image of an object in a destination image space. The pixel values in the destination image are generated from a source image of the object in a source image space. The destination image and the source image each typically comprise a two-dimensional array of evenly-spaced pixels. A pixel in the destination image is transformed to an associated resampled point in the source image space. Intermediate pixel values are determined by interpolation between horizontally-aligned neighbor pixels in the source image space. Neighbor pixels in the same row as the resampled point in the source image space are determined. The distance between the pixels in the source image space are normalized to a value of unity and a first distance between the resampled point and an immediately adjacent neighboring pixel is determined. Distances between the resampled point and the other neighboring pixels in the same row are determined and expressed as a function of this first distance. Cubic interpolation is then performed using these derived distances to arrive at an intermediate pixel value. This is repeated for all rows in a sample image space, each resulting in an intermediate pixel value. A value of the first resampled point in the destination image is then determined by a single vertical cubic interpolation between the intermediate pixel values in the same manner as the horizontal interpolation.

44 Claims, 7 Drawing Sheets

SYSTEM AND METHOD FOR EFFICIENTLY GENERATING CUBIC COEFFICIENTS IN A COMPUTER GRAPHICS SYSTEM

BACKGROUND OF THE INVENTION

1. Field of the Invention

The present invention relates generally to transformation of digital images in computer graphics systems and, more particularly, to an interpolation method and apparatus for performing fast and accurate image transformations.

2. Related Art

A digital image of an object is formed as an array of rows and columns of pixels, which correspond to pixels on a display screen or other display device. Pixels are typically identified by their x, y coordinates in the pixel array. Each pixel has one or more associated values which represent an incremental area of the object. When the image is a black and white image, the pixel value represents a gray shade of the incremental area. When the image is a color image, red, green and blue (R,G,B) values are associated with each pixel. Examples of digital images include, but are not limited to, medical images such as digital x-rays and MRI images, digital film images, digital video images, and satellite images.

Various spatial transformations may be performed on a digital image. These transformations include scaling, rotation and translation of an image or a portion of an image. When an image of an object is magnified, a resampling is required to map the original, or source, image to a magnified, or destination, image. The magnified image is represented by a greater number of pixels than the source image.

A conventional technique for magnifying an image of an object involves a reverse mapping of pixels from the magnified image to resampled points in the source image. In general, the resampled points in the source image do not coincide exactly with single pixel locations. Accordingly, it is necessary to determine a pixel value of the resampled point from one or more pixel values in the neighborhood of the resampled point. Which neighbor pixels of the resampled point are selected depends upon the approach used to determine the value of the resampled point. In one approach, the value of the resampled point is determined as the value of the nearest neighbor pixel in the source image. In another approach, interpolation between a selected number of neighbor pixels is used to determine the value of the resampled point. Typically, either bilinear or bicubic interpolation is utilized. In bilinear interpolation, the four nearest neighbor pixels of the resampled point are determined. Vertically-aligned intermediate pixel values are determined by interpolation between sets of two horizontally-aligned neighbor pixels. Then, the pixel value of the resampled point is determined by interpolation between the vertically-aligned intermediate pixel values. This procedure is repeated for each pixel in the magnified image.

A similar approach is used for bicubic interpolation. There, the sixteen nearest neighbor pixels of the resampled point are determined. Vertically-aligned intermediate pixel values are determined by interpolating between sets of four horizontally-aligned neighbor pixels. Then, the pixel value of the resampled point is determined by interpolation between the four vertically-aligned intermediate pixel values. The process is also repeated for each pixel in the magnified image.

A typical magnified image may have 400×400 to 1600× 1200 pixels. The interpolation operations, which require multiple computations for each pixel in the image, have a high computational cost, particularly in the determination of the weights to assign to the neighboring pixel values. In addition, the efficiency of the interpolation operations decreases as the desired accuracy of the interpolation increases. As a result, the interpolation operations reduce the throughput of the graphics system and may be so time consuming as to be unacceptable to a user. What is needed, therefore, is a computer graphics system that efficiently performs the interpolation operations while not sacrificing the resulting accuracy.

SUMMARY OF THE INVENTION

According to the present invention, methods and apparatus for generating pixel values in a magnified destination image of an object in a destination image space are provided. The pixel values in the destination image are generated from a source image of the object in a source image space. The destination image and the source image each typically comprise a two-dimensional array of evenly-spaced pixels. Each of the pixels has a value representative of the object. Pixel locations of the destination image in the destination image space are determined from a magnification factor and the size and location of the source image. A first pixel in the destination image is transformed to a first resampled point in the source image space. Intermediate pixel values are determined by interpolation between horizontally-aligned neighbor pixels in the source image space. Neighbor pixels in the same row as the first resampled point in the source image space are determined. The distance between the pixels in the source image space are normalized to a value of unity and a first distance between the resampled point and an immediately adjacent neighbor pixel is determined. Distances between the first resampled point and the other neighbor pixels in the same row are determined and expressed as a function of this first distance. Cubic interpolation is then performed using these derived distances to arrive at an intermediate pixel value. This is repeated for all rows in a selected region of the source image space, each resulting in an intermediate pixel value. A pixel value of the first resampled point in the source image space is then determined by a single vertical cubic interpolation between the vertically-aligned intermediate pixel values in the same manner as described above for the horizontal interpolation.

By measuring the distance between the evenly-spaced source image pixels and the resampled point as a function of a single reference distance, conventional cubic interpolation functions are significantly reduced in complexity, which reduces the number of mathematical operations that are required to generate the coefficients. This in turn reduces the amount of hardware required, thereby increasing the speed and efficiency of the interpolator. As a result, the interpolator achieves greater numerical accuracy at a minimal computational cost, achieving an optimal balance between accuracy and efficiency.

Further features and advantages of the present invention as well as the structure and operation of various embodiments of the present invention are described in detail below with reference to the accompanying drawings. In the drawings, like reference numerals indicate identical or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following detailed description when taken in conjunction with the accompanying drawings, in which:

DETAILED DESCRIPTION

Figure 1:
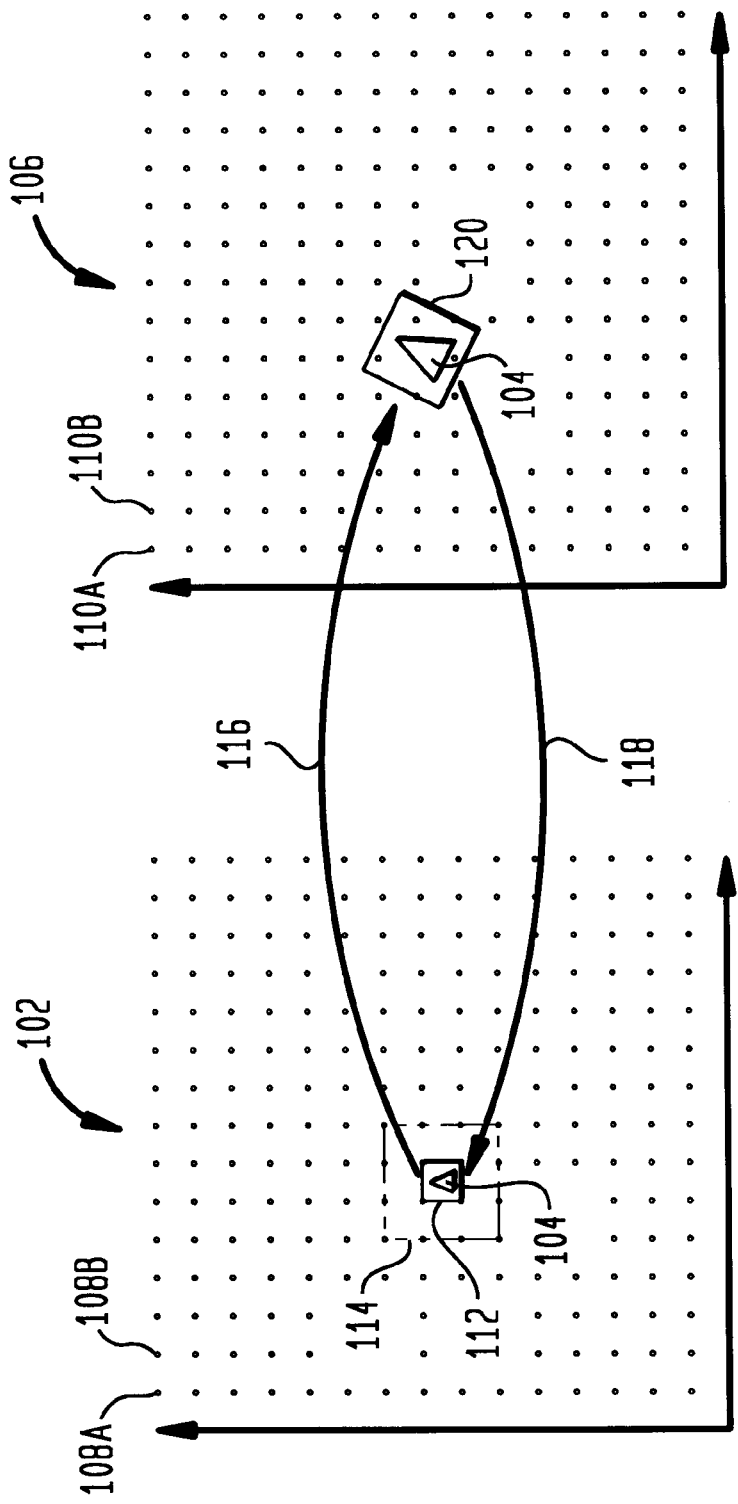
FIG. 1 is a pictorial illustration of image magnification of a source digital image to a destination digital image.

The present invention relates to transformation of a digital image of an object. As shown in FIG. 1, a source image 102 of an object 104 is magnified to provide a destination image 106 of the object 104. The source image 102 is formed in a source image space, and the destination image 106 is formed in a destination image space. The source image 102 and the destination image 106 may each be part of a larger image.

The source image 102 is made up of an array of pixels 108A, 108B, etc. arranged in rows and columns. The destination image 106 is likewise made up of an array of pixels 110A, 110B, etc. arranged in rows and columns. The pixel locations are identified by x, y coordinates in each pixel array. Each of the pixels in the source image 102 has one or more associated pixel values, which represent(s) an incremental area of the object 104. When the image is a black and white image, the pixel value represents a gray shade of the incremental area. When the image is a color image, red, green and blue (R,G,B) values are associated with each pixel 108, 110.

Pixel values in the destination image 106 are determined from the size and location of the source image and the specified magnification factor. For a given display format, the pixel dimensions in the source image 102 and in the destination image 106 are the same. Accordingly, the number of pixels in the magnified destination image 106 is greater than the number of pixels in the source image 102. The present invention provides an efficient method and apparatus for determining the pixel values in the magnified destination image 106.

As will be explained in detail below, a computer graphics system implementing the present invention forward maps 116 a subregion 112 in the source image space 102 to a region 120 in the destination image space 106. This forward mapping may include various spatial transformation, such as scaling, rotation and translation of an image or a portion of an image. Since the image of an object 104 is magnified in the destination image space 106, an image resampling 118 is also required to map the source image 102 to a destination image 106. Since the resampled points in the source image do not generally coincide exactly with single pixel locations 108, the present invention determines a pixel value of the resampled points from one or more pixel values in an interpolation neighborhood 114 of the resampled point. To perform this interpolation, the present invention implements a cubic interpolation approach in a novel manner described below to accurately and efficiently derive the pixel values of the pixels in the destination image space with minimal computational cost, thereby increasing the throughput of the graphics system.

Figure 2:
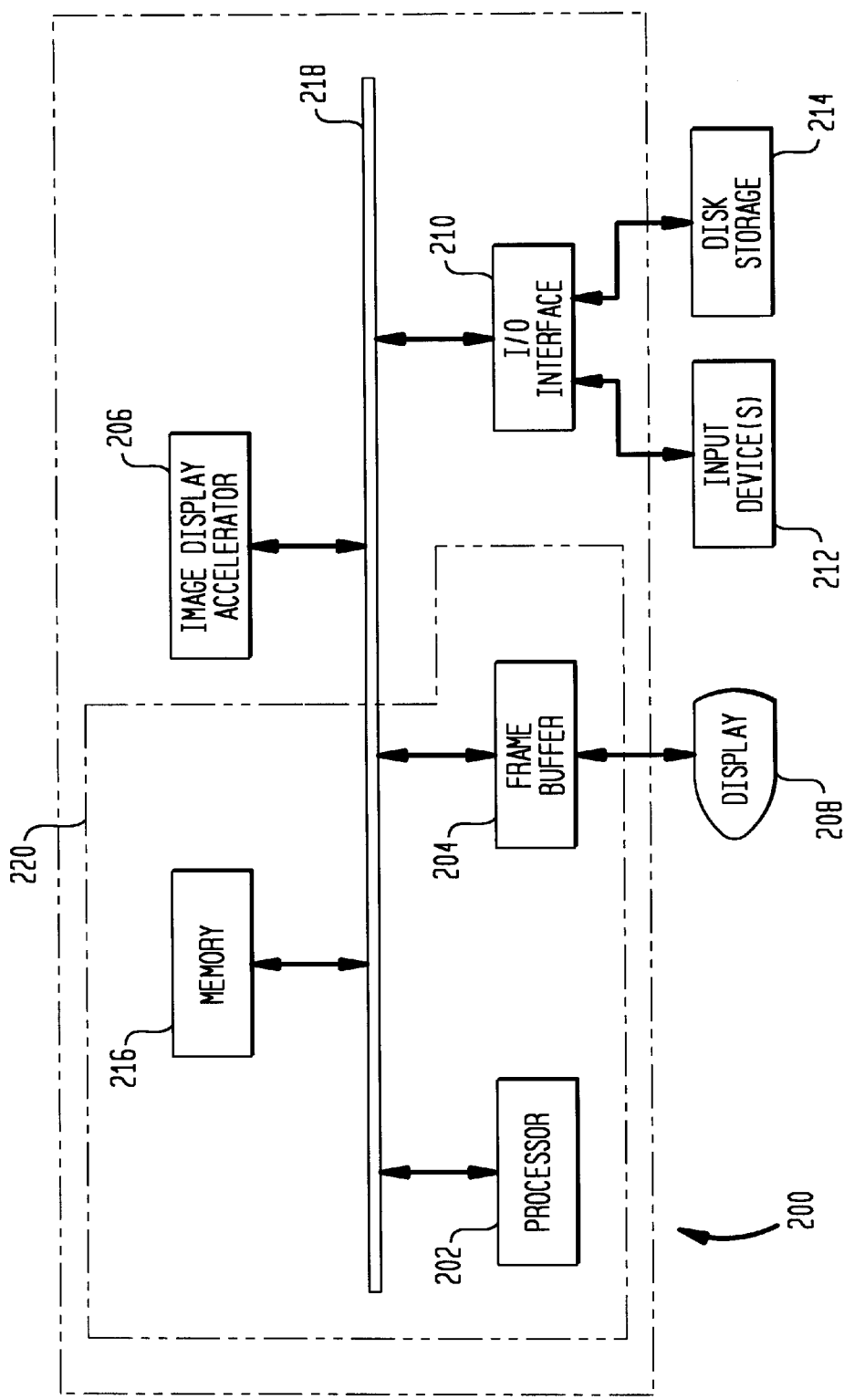
FIG. 2 is a block diagram that of an image processor capable of implementing the coefficient generator of the present invention.

A block diagram of an exemplary image display system 200 suitable for interpolating the source image pixel values in accordance with the present invention is shown in FIG. 2. The image display system 200 includes a central processing unit (CPU) 202, a display 208 for displaying source images and magnified destination images of objects, a frame buffer 204 for storing an image to be displayed on the display 208, and an image display accelerator 206 configured in accordance with the present invention. The system 200 also includes a memory unit 216, an input/output (I/O) interface 210 for interfacing with a disk storage unit 214 and one or more input devices 212. The disk storage unit 214 is typically implemented using one or more hard disk drives. The input device 212 may be implemented using a standard keyboard and a pointing device, such as a mouse or trackball. The functional elements of the image display system 200 communicate with each other via bus 218. Alternatively, the image display accelerator 206 may communicate directly with the frame buffer 204.

The conventional processor 202 provides the primary processing capabilities of the computer system 200 and may, for example, be implemented using a HP PA-RISC SPU manufactured by Hewlett-Packard Company. The memory 214 is used for storage of program instructions and for storage of results of calculations performed by the processor 202. In a preferred embodiment, the memory includes 64 megabytes of random access memory (RAM). The frame buffer 204 is a high speed buffer memory device capable of storing one or more frames of data for the display 208. In the illustrative embodiment, the image display system 200 performs two-dimensional (2-D) image display operations. However, it will be understood that the present invention may be implemented in image processing systems performing one dimensional (1-D) as well as three dimensional (3-D) image processing.

In one embodiment, processor 202, memory unit 214 and frame buffer 204 are provided as a workstation platform 220. Workstation platform 220 may be, for example, a graphics system model HCRX-24 manufactured by Hewlett-Packard Company. The functions and operations of workstation platform 220 are considered to be well known in the art. It will be understood that the hardware components identified above are given by way of example only and that the invention may be implemented in a variety of different workstation platforms and computer graphics systems.

Figure 3:
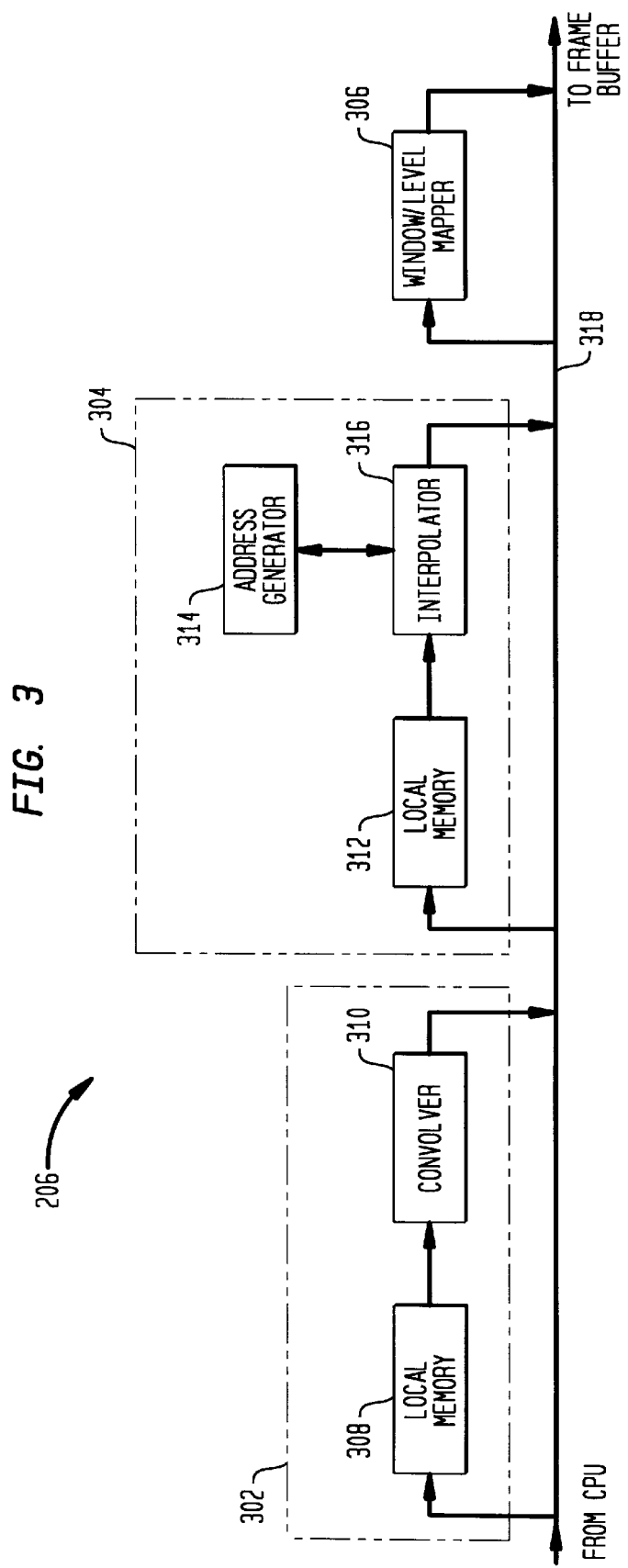
FIG. 3 is a block diagram of the image display accelerator capable of implementing the coefficient generator of the present invention.

A block diagram of one embodiment of an image display accelerator 206 implementing a coefficient generator configured in accordance with the present invention is shown in FIG. 3. The image display accelerator 206 consists of three major components or modules. A conventional convolver module 302 having a local memory 308 and a convolver circuit 310 implements a programmable kernel to perform user-specified spatial filtering functions. A interpolation module 304, including an address generator 314 and an interpolator 316, supports pan, zoom, rotation and mirroring about X or Y axes and other functions using local memory 312. The interpolator 316 contains a coefficient generator configured to perform an efficient cubic interpolation method in accordance with the present invention. Image brightness and contrast control is achieved with a RAM-based look-up table by a conventional window/level map module 306.

Preferably the image display accelerator 206 has a pipelined architecture wherein one, two, or all three of the functional modules 302, 304 and 306 may be active at any given time. As is well known, in such a pipelined architecture, each module may begin processing an image as soon as it has the minimum number of pixels to do so, and passes each output pixel to the next module in the chain as soon as it is ready. In addition, except that the convolver cannot follow the interpolator, the bus 318 connecting the separate modules permits the order of operations to be adjusted arbitrarily.

Certain operations performed by the image display system 200 require localized computations. That is, the operations are performed on pixel neighborhoods or single pixels. Such functions performed by the image display accelerator 206 include the acceleration of the convolution (spatial filtering), window/level mapping (brightness/contrast control), and, of particular significance to the present invention, interpolation (scaling, rotation, translation, mirroring). To increase the performance of system 200 it is desirable to accelerate such operations. Accordingly, it is preferable to implement the image display accelerator 206 in hardware as compared to software. The image display accelerator 206 is preferably a single printed circuit assembly that is electrically connected to the workstation platform 220. Alternatively, software may be used to implement the method of the present invention. The software routines for performing coefficient generation in accordance with the invention may be implemented using the "C" programming language and may reside in memory 216 and/or disk storage unit 214. The computer program for performing coefficient generation in accordance with the invention may be stored on a computer-readable medium such as, for example, magnetic disk, compact disk or magnetic tape and may be loaded into the computer system 200 using an appropriate peripheral device, as known in the art.

Referring to FIGS. 1 and 3, to efficiently map the source and destination image spaces 102 and 106, the address generator 314 performs the forward mapping operation 116 of a series of subregions 112 of the source image space 102 to determine their respective regions 120 in the destination image space 106. The address generator 314 translates, rotates, scales and performs other well-known functions on the selected subregion 112 to map the source image pixels 108 to pixels 110 in the destination image space 106. Once the region 120 has been determined, the address generator 314 traverses the region 120 in the destination image space 106 to provide the interpolator 316 with the pixel addresses. Preferably, the address generator 314 performs this traversal of the region 120 in a manner that addresses each pixel in the region 120 only once. Using the transformed address information the address generator 314 determines all the addresses of each pixel within the subregion 120. The addresses of each pixel to be displayed are sent to the interpolator 316. In one embodiment, the subregion 112 is a two-row-by-two column group of four pixels 108.

Figure 4:
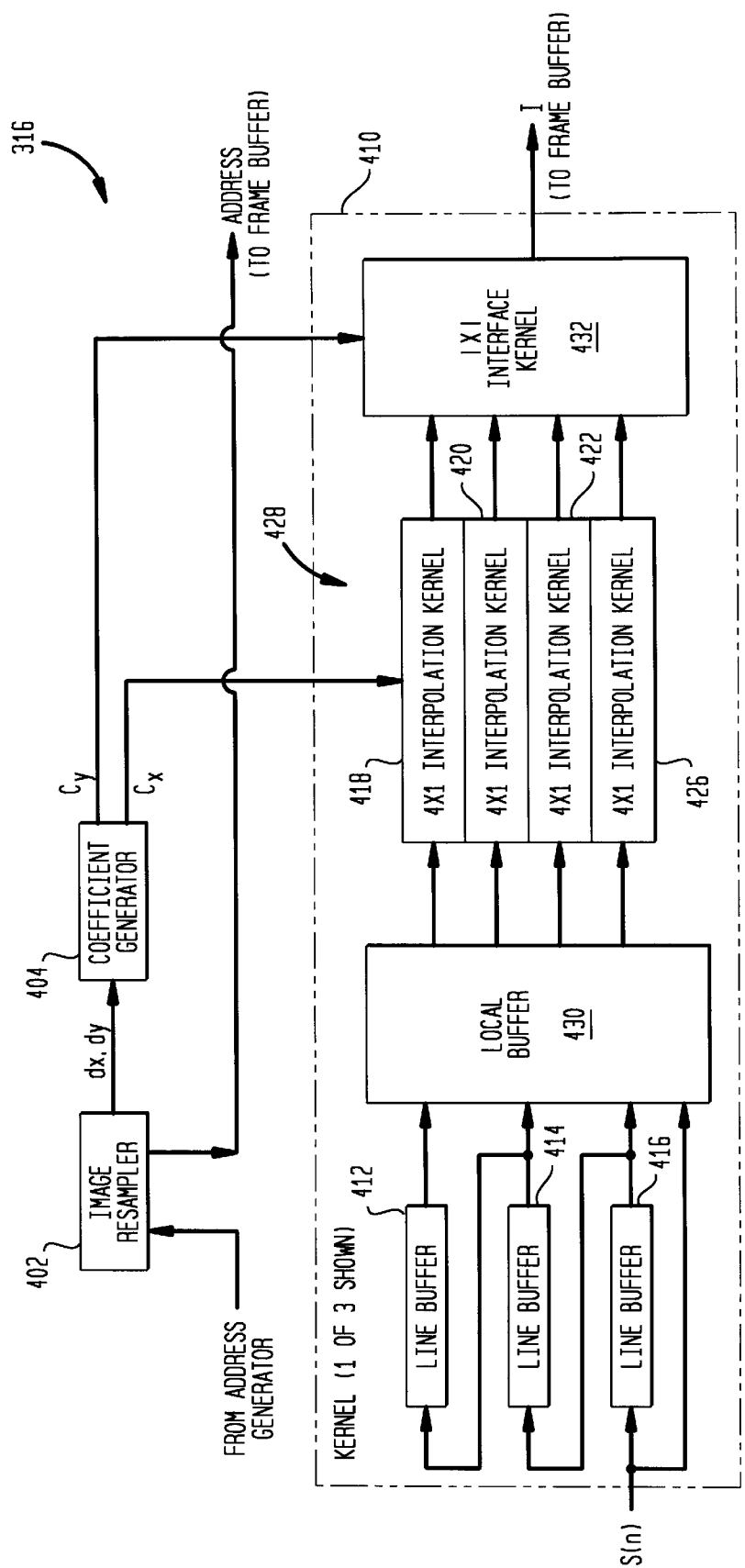
FIG. 4 is a block diagram of one embodiment of an interpolator implementing the coefficient generator in accordance with the present invention.

FIG. 4 is a block diagram of one embodiment of the interpolator 316 implementing the cubic interpolation method of the present invention. Interpolator 310 includes a image resampler 402, a coefficient generator 404 of the present invention, and one (for gray scale) or three (for R, G, B) interpolation kernel(s) 410.

The interpolator 316 determines the pixel value of the destination image pixels by mapping each destination pixel in subregion 120 to a resampled point in the source image space 102 and then determining a pixel value of the resampled point based upon the pixel values of the pixels in the neighborhood of the resampled point as defined by the interpolation window 114. The interpolator 316 includes an interpolation kernel 410 configured to determine a plurality of vertically-aligned intermediate pixel values by interpolating each of a plurality of rows of consecutive source image pixels 108 in the interpolation window 114. These vertically-aligned intermediate pixel values are then interpolated to arrive at a resultant or interpolated pixel value for the resampled point. As will be described below, the intermediate pixel values are a weighted sum of a plurality of horizontal consecutive source image pixel values. Likewise, the resultant pixel value is a weighted sum of the plurality of vertically-aligned intermediate pixel values.

The weights of each of these pixel values are defined by coefficients generated by the coefficient generator 404 in accordance with the present invention. The coefficient generator 404 is configured to determine the values of the coefficients based upon each source image pixel's distance from the resampled point measured as a function of a single reference distance. To achieve an accurate interpolated pixel value, a third degree interpolation, commonly referred to as a cubic interpolation function, is preferably implemented by the coefficient generator 404.

The image resampler 402 determines the location of the resampled point in the source image space 102. Preferably, the image resampler 402 performs the image resampling 118 by implementing a conventional inverse mapping process. For each pixel in the destination image space 106, an inverse transformation is performed by the image resampler 402 to determine the exact relative location of the resampled point in the source image space 102.

Figure 5A:
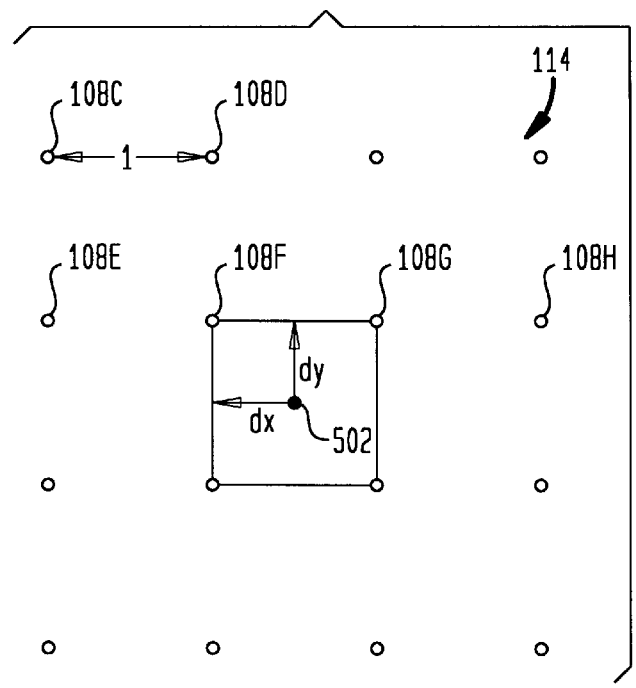
FIG. 5A is an illustration of the interpolation window surrounding a resampled point in accordance with the present invention.

FIG. 5A illustrates the interpolation window 114 surrounding a resampled point 502. In addition to the conventional operations described above, the image resampler 402 normalizes the distance between each of the evenly-spaced source image pixels to unity as shown by source image pixels 108C and 108D. The image resampler 402 measures distances $d_x$ and $d_y$ between the resampled point 502 and the horizontally and vertically nearest neighbor pixel, respectively. These distances are preferably used by the coefficient generator 404 as the reference distances as described below.

Figure 5B:
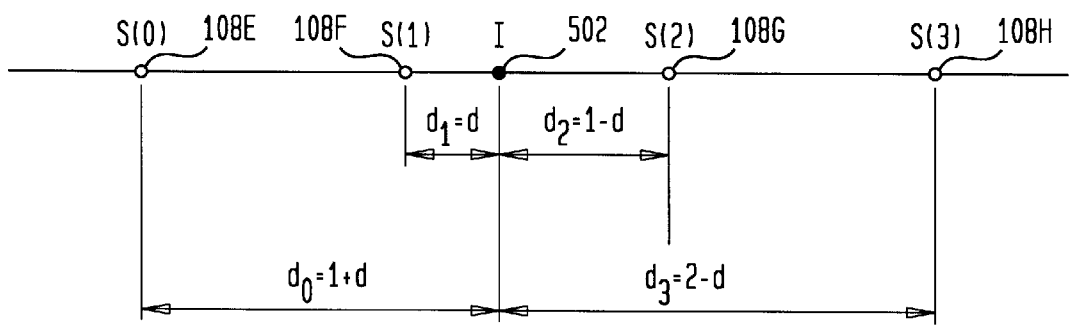
FIG. 5B is an illustration of the distances measure in a source input space for an interpolated point I by a coefficient generator implementing the cubic interpolation method in accordance with the present invention.

The coefficient generator 404 performs a cubic interpolation of source image pixel values in accordance with the present invention and described below. The coefficient generator 404 interpolates in both the X and Y directions using reference distances $d_x$ and $d_y$, respectively. The resulting coefficients are provided to the one or more interpolation kernels 410 where the interpolated value of the resampled point is generated. For ease of description, the coefficient generator 404 will be described with reference to four horizontally-aligned neighboring pixels 108E, 108F, 108G and 108H and the reference distance $d_x$ simply referred to as d as shown in FIG. 5B. Accordingly, the interpolation window 114 illustrated in FIG. 5A includes a four-column-by-four-row (4×4) area of pixels. It is understood, however, that more or less pixels may be considered to be neighbor pixels having pixel values that contribute to the pixel value of the resampled point 502.

As noted, the resultant or interpolated value of the resampled pixel 502 is the weighted function of a plurality of neighbor pixel values. This function is executed in the interpolation kernel 410 and is described in Equation 1:

$$I = C_0 S(0) + C_1 S(1) + C_2 S(2) + C_3 S(3) \tag{1}$$

where I is the resultant or interpolated pixel value of resampled point 502, S(0), S(1), S(2), S(3) are the source input pixel values of pixels 108E–180H, and $C_0$, $C_1$, $C_2$ and $C_3$ are the coefficients or weights applied to the respective input pixels generated in accordance with the cubic interpolation method of the present invention.

Referring to Equations 2–4, the coefficient generator 404 performs a third-degree or cubic interpolation operation to interpolate between selected neighbor pixels. The cubic interpolation function is composed of piecewise cubic polynomials defined on the unit subintervals (−2,−1), (−1,0), (0,1) and (1,2) in the normalized source image space 102. Outside the interval (−2,2) the interpolation function is zero. That is, the pixel values of other pixels do not contribute to the resultant interpolated pixel value. As a result, each interpolated pixel value I is a weighted sum of four consecutive input points, with a desirable symmetry property of retaining two source image pixels on each side of the resampled point. This gives rise to a symmetric, space-invariant, interpolation function of the form provided in Equations 2–4:

$$C_n = (A+2)|d_n|^3 - (A+3)|d_n|^2 + 1 \text{ for } 0 \leq |d_n| < 1 \tag{2}$$

$$C_n = A|d_n|^3 - 5A|d_n|^2 + 8A|d_n| - 4A \text{ for } 1 \leq |d_n| < 2 \tag{3}$$

$$C_n = 0 \text{ for } 2 \leq |d_n| \tag{4}$$

where, A is a well-known "sharpness factor" and $d_n$ is the distance from source pixel S(n) to the resampled point in source image space 102.

Conventional coefficient generators implementing the above cubic interpolation function have typically used different values of $d_n$ when determining the coefficient for the respective source data point S(n). This results in a conventional coefficient generator having to perform a significant number of operations that are time consuming, even when implemented in hardware. For example, one conventional coefficient generator utilizes a minimum of 18 multipliers, 6 subtractors and 4 adders per interpolated data point I. These operations have a high computation cost, adversely affecting the throughput of the graphics system.

This process can be simplified and the coefficient generator hardware requirements reduced by replacing the $d_n$ components with a distance measured in terms of a single reference distance. This simplification is based upon the assumption that, for the majority of cases where a cubic interpolation is used, the source image pixel space 102 has pixels 108 that are evenly spaced as noted above with reference to FIG. 5A.

In the illustrative embodiment, the single reference distance value used by the coefficient generator 404 is the distance d between the resampled point 502 and the source image pixel S(1) 108F. It is understood that other arbitrary values of d, wherein $0 \leq |d| \leq 1$ (assuming normalized source image space) may be used. Preferably, the value of d is provided by the image resampler 402 as described above. As noted, all distances measured by the coefficient generator 404 are expressed in terms of this reference distance value, shown in FIG. 5B, as the distance between the resampled point I and the source data point S(1). The distance between I and source data point S(2) is then 1−d since the distance between S(1) and S(2) is 1. In like manner, the distance between the interpolated point I and the source data points S(0) and S(3) is 1+d and 2−d, respectively. By using this measurement between source data points, it is then possible to rearrange the above conventional interpolation function provided in Equations 2–4 to use only the reference value d which results in simple, cubic relationships for accurately determining the coefficient values that may be calculated quickly. These cubic relationships are now described.

Since the distance $d_0$ between I and S(0) is 1+d, which is between 1 and 2, then using Equation 3, $$C_0 = A d_0^3 - 5A d_0^2 + 8A d_0 - 4A \tag{5}$$

Substituting yields:

$$C_0 = A(1+d)^3 - 5A(1+d)^2 + 8A(1+d) - 4A \tag{6}$$

This reduces to:

$$C_0 = Ad^3 - 2Ad2 + Ad \tag{7}$$

Since the distance $d_1$ between I and S(1) is d, which must be between 0 and 1, then using Equation 2, $$C_1 = (A+2)d_1^3 - (A+3)d_1^2 + 1 \tag{8}$$

Substituting yields:

$$C_1 = (A+2)d^3 - (A+3)d^2 + 1 \tag{9}$$

Since the distance $d_2$ between I and S(2) is 1−d, which must be between 0 and 1, then using Equation 2, $$C_2 = (A+2)d_2^3 - (A+3)d_2^2 + 1 \tag{10}$$

Substituting yields:

$$C_2 = (A+2)(1-d)^3 - (A+3)(1-d)^2 + 1 \tag{11}$$

This reduces to:

$$C_2 = -(A+2)d^3 + (2A+3)d^2 - Ad \tag{12}$$

Since the distance $d_3$ between I and S(3) is 2−d, which must be between 1 and 2, then using Equation 3, $$C_3 = A d_3^3 - 5A d_3^2 + 8A d_3 - 4A \tag{13}$$

Substituting yields:

$$C_3 = A(2-d)^3 - 5A(2-d)^2 + 8A(2-d) - 4A \tag{14}$$

This reduces to:

$$C_3 = Ad^3 - Ad^2 \tag{15}$$

Figure 6:
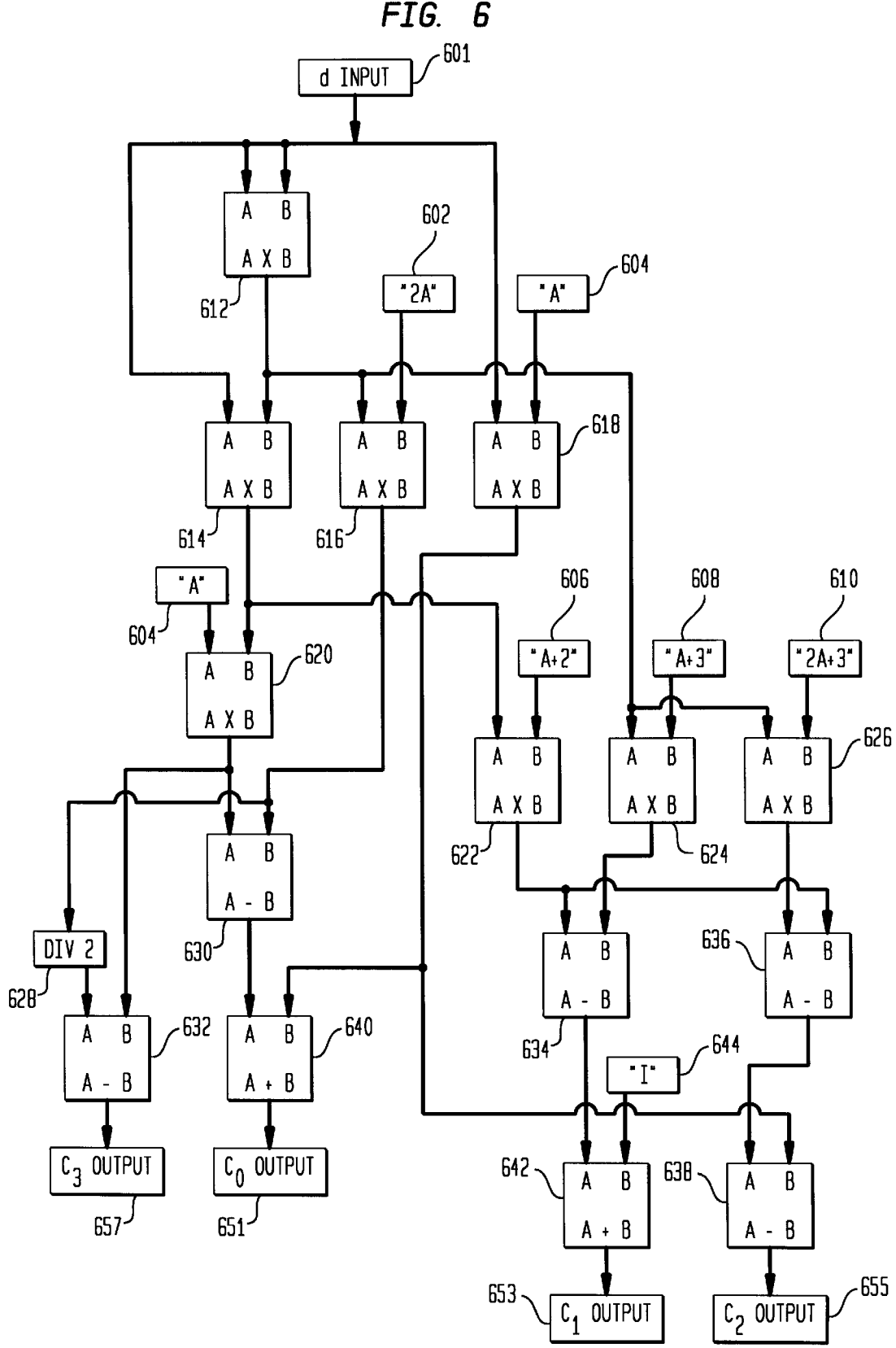
FIG. 6 illustrates the hardware required to implement the cubic interpolation of the present invention.

FIG. 6 is a block diagram of the coefficient generator 404 configured to implement the resulting relationships provided by Equations 7, 9, 12 and 15, repeated below for clarity:

$$C_0 = Ad^3 - 2Ad2 + Ad \tag{7}$$

$$C_1 = (A+2)d^3 - (A+3)d^2 + 1 \tag{9}$$

$$C_2 = -(A+2)d^3 + (2A+3)d^2 - Ad \tag{12}$$

$$C_3 = Ad^3 - Ad^2 \tag{15}$$

The coefficient generator 404 receives a single input 601 consisting of the reference value d and quickly generates 4 outputs 651, 653, 655 and 657 comprising the coefficient values $C_0$, $C_1$, $C_2$, and $C_3$, respectively. Preferably, the coefficient generator 404 computes the terms including the sharpness factor A (2A, A, A+2, A+3 and 2A+3) and loads the resulting values into registers 602, 604, 606, 608 and 610 before interpolation is started. The coefficient generator hardware necessary to determine the coefficients using the above relationships requires eight multipliers 612, 614, 616, 618, 620, 622, 624 and 626, one hardwired divide by 2 (a bit shift) 628, five subtractors 630, 632, 634, 636 and 638 and two adders 640 and 642. This results in a coefficient generator of the present invention that has at least 50% less hardware than conventional coefficient generators. This increases the efficiency and reduces the computational cost of performing the interpolation operations, increasing the throughput of the graphics system 200.

The coefficient outputs 651, 653, 655 and 657 are provided to the interpolation kernels 410 to apply them to the source image and intermediate pixel values. Since the interpolation kernel 410 requires multiple pixels from multiple rows to be available to compute the intermediate pixel values, line buffer memory 412, 414 and 416 are provided to store pixel values from four rows of the interpolation window 114 of the source input space 102. A "4×4" interpolation kernel module 428 containing four 4×1 interpolation kernels 418, 420, 422 and 424 are used to determine the coefficients for each of the four rows of pixels using Equation 1. Only three line buffer memory units are required since the fourth line is obtained from the input S(n).

A local buffer 430 is interposed between the line buffers and the interpolation kernels. Each of the 4×1 interpolation kernels 418–426 generates an intermediate pixel value, using the coefficients generated for the horizontally-aligned neighbor pixels, that is provided to a 4×1 interpolation kernel 432. This kernel 432 determines the resultant interpolation value for the resampled point 502 based upon coefficients provided by the coefficient generator 404 for the vertically-aligned neighbor pixels using Equation 1. The resulting combination of address and data is then sent to the frame buffer 204 for display on display 208.

Conventional line buffers 412–416 each hold a single row of input pixel values and shifts a pixel value into one of the interpolation kernels 418–426 for each new destination image space pixel computation. The line buffers are chained together such that one line buffer is fed from the incoming pixel stream and dumps its output to both the kernel registers 418–426 and the following line buffer. With this chained arrangement the interpolator 316 can sequence through the entire input image one row after another.

As noted, the interpolator kernel 410 and coefficient generator 404 preferably perform an interpolation at the sample point in the input space using an interpolation window 114 to determine the respective output pixel intensity. However, it is understood that other approaches to selecting the neighbor pixels to include in the determination of the interpolated pixel value may be used.

Figure 7:
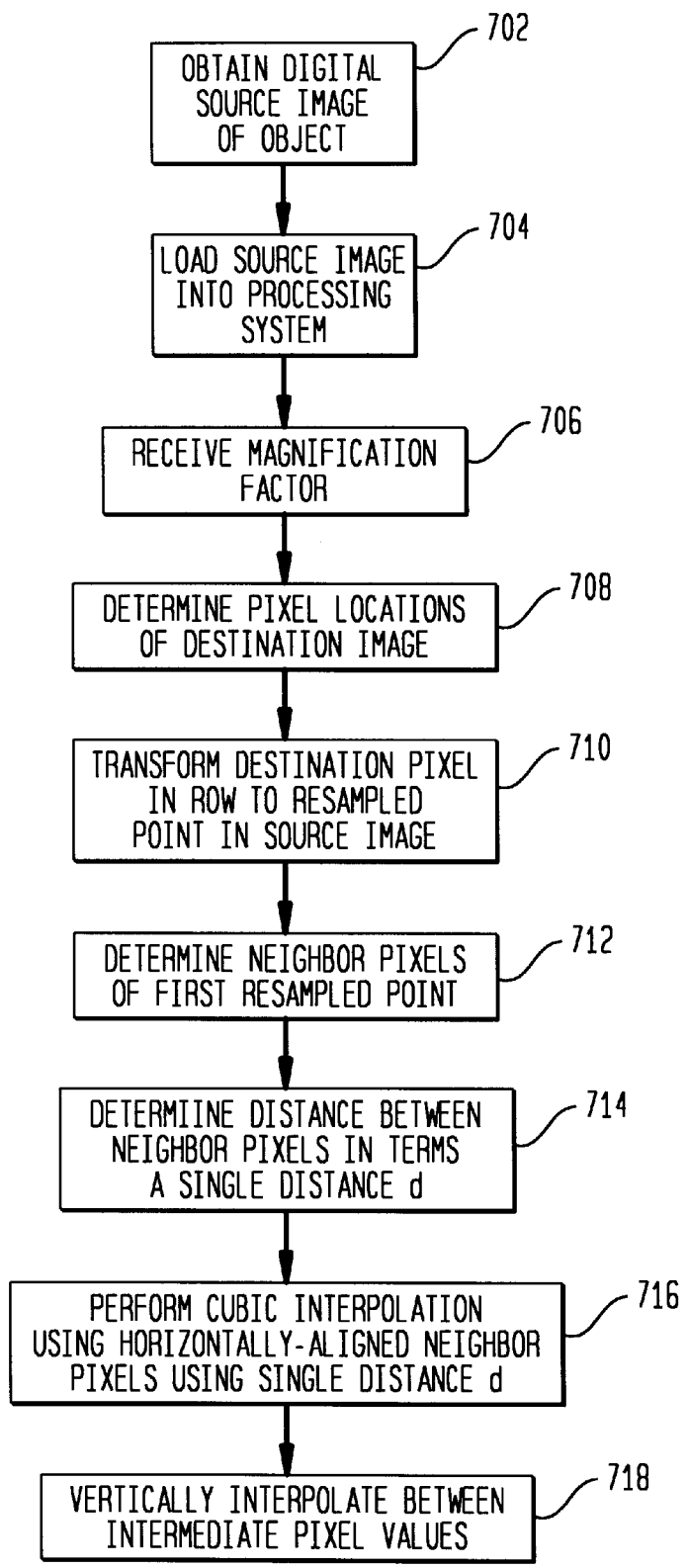
FIG. 7 is a flow chart of an exemplary process performed by an interpolator in accordance with the present invention.

One process for generating a magnified destination image from a source image in accordance with the invention is illustrated in the flow chart of FIG. 7. A digital source image of an object is obtained in step 702. The digital source image may be a digital x-ray, an MRI image, a digital film image, a digital video image, a satellite image or any other image of an object in digital format. In the case of a black and white image, each pixel is represented by a single digital word of a predetermined number of bits such as, for example, 8 bits. In the case of a color image, each pixel is represented by 3 digital words corresponding to red, green and blue values, and the operations described below are performed for each color value. The source image is loaded into a system 200 in step 704. The transformation system receives a magnification factor in step 706. The magnification may be performed on all or part of the source image. Pixel locations in the magnified destination image are determined in step 708 based on the source image location and size, and the required magnification factor. It should be noted that in the above description image magnification has been used to provide a contact in which the interpolation approach of the present invention may be implemented. It is understood however, that the present invention is suitable for use by the graphics system in performing other types of transformations as well.

A pixel in a row of the destination image is transformed to a resampled point in the source image using image resampler 402 in step 710, and neighbor pixels of the resampled point are determined in step 712. As described above, four neighbor pixels are preferably utilized for the efficient cubic interpolation of the present invention. Horizontal interpolations between horizontally-aligned neighbor pixels are performed in step 714 using Equations 7, 9, 12 and 15 to determine intermediate, row-derived pixel values. Vertical interpolation between the intermediate pixel values is performed in step 716 to determine the value of the interpolated pixel in the destination image. This process is then repeated for the remaining pixels in the sample region 112.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An interpolator for use in a computer graphics system for generating pixel values in a destination image of an object in a destination image space from a source image of the object in a source image space, wherein said destination image and said source image each comprise an array of pixels having one or more dimensions, the pixels being equally spaced along each dimension, each of the source image pixels having a pixel value representative of the object, and each of the destination image pixels having an interpolated pixel value, the interpolator comprising:

an interpolation circuit configured to determine an interpolated pixel value for a destination image pixel, wherein said interpolated pixel value is a weighted sum of pixel values associated with a plurality of consecutive source image pixels, said weights defined by coefficients; and a coefficient generator configured to apply a cubic function to said plurality of consecutive source image pixel values to generate said coefficients, wherein said coefficients are based upon each associated source image pixel's distance from a resampled point in said source image space that is associated with said destination image pixel, wherein said distances are expressed as a function of a single reference distance, wherein said reference distance is a distance between one of said plurality of consecutive source image pixels adjacent to said resampled point and said resampled point.

2. The interpolator of claim 1, wherein said weighted sum is defined by:

$$I = C_0 S(0) + C_1 S(1) + C_2 S(2) + C_3 S(3)$$

wherein I represents said interpolated pixel value, S(0), S(1), S(2), S(3) represent said pixel values of said source image pixels, and wherein $C_0$, $C_1$, $C_2$ and $C_3$ represent coefficients corresponding with said interpolated pixel values.

3. The interpolator of claim 1, wherein said consecutive source image pixel adjacent to said resampled point is one of said plurality of consecutive source image pixels that is closest to said resampled point.

4. The interpolator of claim 1, further comprising:

an image resampler configured to determine a location of said resampled point in said source image space for said destination image pixel and for providing said coefficient generator with said reference distance.

5. The interpolator of claim 1, wherein said source and destination images each comprises a two-dimensional pixel array, and wherein said interpolator determines said interpolated value for all destination image pixels having associated resampled points in a predetermined subregion of said source image space.

6. An image display accelerator for use in computer graphics system for generating pixel values in a destination image of an object in a destination image space from a source image of the object in a source image space, wherein said destination image and said source image each comprise an array of pixels having one or more dimensions, the pixels being equally spaced along each dimension, each of said source image pixels having a pixel value representative of the object, and each of said destination image pixels having an interpolated pixel value, the image display accelerator comprising:

an interpolator module for determining an interpolated pixel value for a destination image pixel, wherein said interpolated pixel value is a weighted sum of pixel values associated with a plurality of consecutive source image pixels, said weights defined by coefficients based upon each associated source image pixel's distance from a resampled point in the source image space that is associated with said destination image pixel, wherein said distances are expressed as a function of a single reference distance, wherein said reference distance is a distance between one of said plurality of consecutive source image pixels adjacent to said resampled point and said resampled point.

7. The image display accelerator of claim 6, wherein the image display accelerator is implemented in a single printed circuit assembly.

8. The image display accelerator of claim 6, wherein said interpolator module comprises:

an address generator for forward mapping a predetermined subregion of said source image to determine a respective region in said destination image space and for traversing said respective region in a manner that processes each of said destination image pixels in said associated region only once.

9. The image display accelerator of claim 7, wherein said interpolator module comprises:

an interpolation circuit configured to determine said interpolated pixel value for said destination image pixel;

a coefficient generator for generating said coefficients for said interpolation circuit; and an image resampler configured to determine said resampled point in said source image space for said destination image pixel and for providing said coefficient generator with said reference distance.

10. A computer graphics system for generating pixel values in a destination image of an object in a destination image space from a source image of the object in a source image space, wherein said destination image and said source image each comprise an array of pixels having one or more dimensions, the pixels being spaced at a normalized distance of unity along each dimension, each of the source image pixels having a pixel value representative of the object, and each of the destination image pixels having an interpolated pixel value, the system comprising:

an interpolator module for determining an interpolated pixel value for a destination image pixel, wherein said interpolated pixel value is a weighted sum of pixel values associated with a plurality of consecutive source image pixels, said weights defined by coefficients based upon each associated source image pixel's distance from a resampled point in the source image space that is associated with said destination image pixel, wherein said distances are expressed as a function of a single reference distance, wherein said reference distance is a distance between one of said plurality of consecutive source image pixels adjacent to said resampled point and said resampled point.

11. A computer graphics system for generating pixel values in a destination image of an object in a destination image space from a source image of the object in a source image space, wherein said destination image and said source image each comprise an array of pixels having one or more dimensions, the pixels being equally spaced at a normalized distance of unity along each dimension, each of the source image pixels having a pixel value representative of the object, and each of the destination image pixels having an interpolated pixel value, the system comprising:

means for determining an interpolated pixel value for a destination image pixel, wherein said interpolated pixel value is a weighted sum of pixel values associated with a plurality of consecutive source image pixels, said weights defined by coefficients; and means for determining said coefficients by applying a cubic function to said plurality of consecutive source image pixel values to generate said coefficients, wherein said coefficients are based upon each associated source image pixel's distance from a resampled point in the source image space that is associated with said destination image pixel, wherein said distances are expressed as a function of a single reference distance, wherein said reference distance is a distance between one of said plurality of consecutive source image pixels adjacent to said resampled point and said resampled point.

12. The computer graphics system of claim 11, further comprising:

means for determining said resampled point in said source image space for said destination image pixel and for providing said coefficient generator with said reference distance.

13. The computer graphics system of claim 12, wherein said plurality of consecutive source image pixels are aligned with said resampled point with two of said consecutive source image pixels on opposite sides of said resampled point, wherein said distance between said source image pixels S(0), S(1), S(2), and S(3) are 1+d, d, 1−d, and 2−d, respectively, wherein d represents said single reference distance.

14. A method for generating pixel values in a destination image of an object in a destination image space from a source image of the object in a source image space, wherein said destination image and said source image each comprise an array of pixels having one or more dimensions, said pixels being equally spaced at a normalized distance of unity along each dimension, each of said source image pixels having a pixel value representative of the object, and each of said destination image pixels having an interpolated pixel value, the method comprising the steps of:

(a) transforming each pixel in said destination image to a corresponding resampled point in said source image space;

(b) determining a value of a first pixel in each row of the destination image, including the steps of:
  (1) horizontally interpolating between horizontally-aligned neighbor pixels of the corresponding resampled point to provide intermediate pixel values, said horizontal interpolation based upon a weighted value of said horizontally-aligned neighbor pixels and their distance from said corresponding resampled point, said distances measured as a function of a first single reference distance, wherein said first reference distance is a distance between one of said horizontally-aligned neighbor source image pixels adjacent to said resampled point and said resampled point, and
  (2) vertically interpolating between said intermediate pixel values to provide the value of said first pixel, said vertical interpolation based upon a weighted value of said vertically-aligned intermediate pixels and their distance from said corresponding resampled point, said distances measured as a function of a second reference distance.

15. The method of claim 14, wherein said step b)(1) comprises determining four neighbor pixels and wherein said distances between first, second, third and fourth source image pixels are 1+d, d, 1−d, and 2−d, respectively, wherein d represents said first reference distance.

16. The method of claim 15, wherein said weighted values are represented by coefficients, and wherein said step (b)(1) comprises the steps of:
  (a) determining said coefficients in accordance with:

$C_0 = Ad^3 - 2Ad2 + Ad;$ $C_1 = (A+2)d_1^3 - (A+3)d_1^2 + 1;$ $C_2 = -(A+2)d^3 + (2A+3)d^2;$ and $C_3 = Ad^3 - Ad^2;$ (2) interpolating said pixel values and said coefficients to arrive at said interpolated pixel value in accordance with:

$I = C_0 S(0) + C_1 S(1) + C_2 S(2) + C_3 S(3),$ wherein I represents said interpolated pixel value, S(0), S(1), S(2), S(3) represent said pixel values of said source image pixels, and wherein $C_0$, $C_1$, $C_2$ and $C_3$ represent said coefficients, wherein A is a predefined sharpness factor, and wherein $d_n$ is said distance from said source image pixel S(n) to said resampled point.

17. The method of claim 15, further comprising:
  (c) repeating steps (a)–(b) for each pixel in said destination image.

18. An interpolator for use in a computer graphics system for generating pixel values in a destination image of an object in a destination image space from a source image of the object in a source image space, wherein said destination image and said source image each comprise an array of pixels having one or more dimensions, the pixels being equally spaced along each dimension, each of the source image pixels having a pixel value representative of the object, and each of the destination image pixels having an interpolated pixel value, the interpolator comprising:
  an interpolation circuit configured to determine an interpolated pixel value for a destination image pixel, wherein said interpolated pixel value is a weighted sum of pixel values associated with a plurality of consecutive source image pixels, said weights defined by coefficients; and
  a coefficient generator configured to generate said coefficients based on each associated source image pixel's distance from a resampled point in said source image space that is associated with said destination image pixel, wherein said distances are expressed as a function of a single reference distance between one of said plurality of consecutive source image pixels that is immediately adjacent to said resampled point and said resampled point.

19. The interpolator of claim 18, wherein said consecutive source image pixel immediately adjacent to said resampled point is one of said plurality of consecutive source image pixels that is closest to said resampled point.

20. An interpolator for use in a computer graphics system for generating pixel values in a destination image of an object in a destination image space from a source image of the object in a source image space, wherein said destination image and said source image each comprise an array of pixels having one or more dimensions, the pixels being equally spaced along each dimension, each of the source image pixels having a pixel value representative of the object, and each of the destination image pixels having an interpolated pixel value, the interpolator comprising:
  an interpolation circuit configured to determine an interpolated pixel value for a destination image pixel, wherein said interpolated pixel value is a weighted sum of pixel values associated with a plurality of consecutive source image pixels, said weights defined by coefficients; and
  a coefficient generator configured to apply a cubic function to said plurality of consecutive source image pixel values to generate said coefficients, wherein said coefficients are based upon each associated source image pixel's distance from a resampled point in said source image space that is associated with said destination image pixel, wherein said distances are expressed as a function of a single reference distance, wherein said reference distance is that distance between one of said plurality of consecutive source image pixels that is immediately adjacent to said resampled point and said resampled point,
  wherein said source and destination images each comprises a two-dimensional pixel array, and wherein said interpolator determines said interpolated value for all destination image pixels having associated resampled points in a predetermined subregion of said source image space, wherein said subregion is included in an interpolation window of said source image space.

21. The interpolator of claim 5, wherein said subregion is included in an interpolation window of said source image space.

22. The interpolator of claim 2, wherein said plurality of consecutive source image pixels are aligned with said resampled point with two of said consecutive source image pixels on opposite sides of said resampled point, wherein said distance between said source image pixels S(0), S(1), S(2), and S(3) are 1+d, d, 1−d, and 2−d, respectively, wherein d represents said reference distance.

23. The interpolator of claims 20, wherein said plurality of consecutive source image pixels are aligned with said resampled point with two of said consecutive source image pixels on opposite sides of said resampled point, wherein said distance between said source image pixels S(0), S(1), S(2), and S(3) are 1+d, d, 1−d, and 2−d, respectively, wherein d represents said reference distance.

24. The interpolator of claim 23, wherein said weighted sum is defined by:

$$I=C_0S(0)+C_1S(1)+C_2S(2)+C_3S(3),$$

wherein I represents said interpolated pixel value, S(0), S(1), S(2), S(3) represent said pixel values of said source image pixels, and wherein $C_0$, $C_1$, $C_2$ and $C_3$ represent coefficients corresponding with said interpolated pixel values.

25. The interpolator of claim 20, wherein said consecutive source image pixel adjacent to said resampled point is one of said plurality of consecutive source image pixels that is closest to said resampled point.

26. The interpolator of claim 20, further comprising:
an image resampler configured to determine a location of said resampled point in said source image space for said destination image pixel and for providing said coefficient generator with said reference distance.

27. The interpolator of claim 20, wherein said cubic function is:

$$C_x=(A+2)|d_n|^3-(A+3)|d_n|^2+1 \text{ for } 0\leq|d_n|<1$$

$$C_x=A|d_n|^3-5A|d_n|^2+8A|d_n|-4A \text{ for } 1\leq|d_n|<2$$

$$C_x=0 \text{ for } 2\leq|d_n|$$

wherein A is a predefined sharpness factor and wherein $d_n$ is said distance from said source image pixel S(n) to said resampled point in said source image space.

28. The interpolator of claim 27, wherein, for each consecutive image pixel, said coefficients are determined by said coefficient generator in accordance with:

$$C_0=Ad^3-2Ad2+Ad;$$

$$C_1=(A+2)d_1^3-(A+3)d_1^2+1;$$

$$C_2=-(A+2)d^3+(2A+3)d^2; \text{ and}$$

$$C_3=Ad^3-Ad^2.$$

29. An interpolator for use in a computer graphics system for generating pixel values in a destination image of an object in a destination image space from a source image of the object in a source image space, wherein said destination image and said source image each comprise an array of pixels having one or more dimensions, the pixels being equally spaced along each dimension, each of the source image pixels having a pixel value representative of the object, and each of the destination image pixels having an interpolated pixel value, the interpolator comprising:
an interpolation circuit configured to determine an interpolated pixel value for a destination image pixel, wherein said interpolated pixel value is a weighted sum of pixel values associated with a plurality of consecutive source image pixels, said weights defined by coefficients; and
a coefficient generator configured to apply a cubic function to said plurality of consecutive source image pixel values to generate said coefficients, wherein said coefficients are based upon each associated source image pixel's distance from a resampled point in said source image space that is associated with said destination image pixel, wherein said distances are expressed as a function of a single reference distance,
wherein said reference distance is a distance between one of said plurality of consecutive source image pixels adjacent to said resampled point and said resampled point, wherein said adjacent consecutive source image pixel is one of said plurality of consecutive source image pixels that is closest to said resampled point, and wherein said weighted sum is defined by:

$$I=C_0S(0)+C_1S(1)+C_2S(2)+C_3S(3)$$

wherein I represents said interpolated pixel value, S(0), S(1), S(2), S(3) represent said pixel values of said source image pixels, and wherein $C_0$, $C_1$, $C_2$ and $C_3$ represent coefficients corresponding with said interpolated pixel values.

30. The interpolator of claim 29, further comprising:
an image resampler configured to determine a location of said resampled point in said source image space for said destination image pixel and for providing said coefficient generator with said reference distance.

31. The interpolator of claim 29, wherein said cubic function is:

$$C_x=(A+2)|d_n|^3-(A+3)|d_n|^2+1 \text{ for } 0\leq|d_n|<1$$

$$C_x=A|d_n|^3-5A|d_n|^2+8A|d_n|-4A \text{ for } 1\leq|d_n|<2$$

$$C_x=0 \text{ for } 2\leq|d_n|$$

wherein A is a predefined sharpness factor and wherein $d_n$ is said distance from said source image pixel S(n) to said resampled point in said source image space.

32. The interpolator of claim 31, wherein for each consecutive image pixel, said coefficients are determined by said coefficient generator in accordance with:

$$C_0=Ad^3-2Ad2+Ad;$$

$$C_1=(A+2)d_1^3-(A+3)d_1^2+1;$$

$$C_2=-(A+2)d^3+(2A+3)d^2; \text{ and}$$

$$C_3=Ad^3-Ad^2.$$

33. The image display accelerator of claim 6, wherein said interpolator module comprises:
a coefficient generator for generating said coefficients.

34. The computer graphics system of claim 10, wherein said weighted sum is defined by:

$$I=C_0S(0)+C_1S(1)+C_2S(2)+C_3S(3),$$

wherein I represents said interpolated pixel value, S(0), S(1), S(2), S(3) represent said pixel values of said source image pixels, and wherein $C_0$, $C_1$, $C_2$ and $C_3$ represent coefficients corresponding with said interpolated pixel values.

35. The computer graphics system of claim 34, wherein said consecutive source image pixel adjacent to said resampled point is one of said plurality of consecutive source image pixels that is closest to said resampled point.

36. The computer graphics system of claim 34, wherein said coefficients are generated by an application of a cubic function to said plurality of source image pixel values, where in cubic function is:

$$C_x=(A+2)|d_n|^3 31 \ (A+3)|d_n|^2+1 \text{ for } 0\leq|d_n|<1$$

$$C_x=A|d_n|^3-5A|d_n|^2+8A|d_n|-4A \text{ for } 1\leq|d_n|<2$$

$$C_x=0 \text{ for } 2\leq|d_n|$$

wherein A is a predefined sharpness factor and wherein $d_n$ is said distance from said source image pixel S(n) to said resampled point in said source image space.

37. The computer graphics system of claim 36, wherein, for each consecutive image pixel, said coefficients are determined in accordance with:

$$C_0 = Ad^3 - 2Ad^2 + Ad;$$

$$C_1 = (A+2)d_1^3 - (A+3)d_1^2 + 1;$$

$$C_2 = -(A+2)d^3 + (2A+3)d^2; \text{ and}$$

$$C_3 = Ad^3 - Ad^2.$$

38. The computer graphics system of claim 34, wherein said plurality of consecutive source image pixels are aligned with said resampled point with two of said consecutive source image pixels on opposite sides of said resampled point, wherein said distance between said source image pixels S(0), S(1), S(2), and S(3) are 1+d, d, 1−d, and 2−d, respectively, wherein d represents said reference distance.

39. The interpolator of claim 22, wherein said cubic function is:

$$C_x = (A+2)|d_n|^3 31 \ (A+3)|d_n|^2 + 1 \text{ for } 0 \leq |d_n| < 1$$

$$C_x = A|d_n|^3 - 5A|d_n|^2 + 8A|d_n| - 4A \text{ for } 1 \leq |d_n| < 2$$

$$C_x = 0 \text{ for } 2 \leq |d_n|$$

wherein A is a predefined sharpness factor and wherein $d_n$ is said distance from said source image pixel S(n) to said resampled point in said source image space, and wherein, for each of four consecutive image pixels, said coefficients are determined by said coefficient generator in accordance with:

$$C_0 = Ad^3 - 2Ad^2 + Ad;$$

$$C_1 = (A+2)d_1^3 - (A+3)d_1^2 + 1;$$

$$C_2 = -(A+2)d^3 + (2A+3)d^2; \text{ and}$$

$$C_3 = Ad^3 - Ad^2.$$

40. The interpolator of claim 21, wherein said predetermined subregion comprises a group of four source image pixels located in two consecutive rows and two consecutive columns, and wherein said interpolation window comprises a group of sixteen source image pixels located in four consecutive rows and four consecutive columns.

41. The interpolator of claim 40, wherein said interpolation circuit is configured to determine an intermediate interpolated pixel value for each of said four consecutive rows of said source image pixels in said interpolation window, and to determine said interpolated pixel value using said four intermediate interpolated pixel values.

42. The interpolator of claim 5, wherein said coefficient generator determines said coefficients for each of said intermediate interpolation values and said interpolated value.

43. The interpolator of claim 40, wherein said interpolating circuit comprises:

four row interpolation circuits, each for determining one of said intermediate interpolation values based upon said coefficients generated by said coefficient generator; and a column interpolation circuit for determining said interpolation value based upon coefficients generated by said coefficient generator and said intermediate interpolation values.

44. The image display accelerator of claim 33, wherein said weighted sum is defined by:

$$I = C_0 S(0) + C_1 S(1) + C_2 S(2) + C_3 S(3),$$

and wherein for each of said four consecutive image pixels, said coefficients are determined by said coefficient generator based upon the following relationships:

$$C_0 = Ad^3 - 2Ad^2 + Ad;$$

$$C_1 = (A+2)d_1^3 - (A+3)d_1^2 + 1;$$

$$C_2 = -(A+2)d^3 + (2A+3)d^2; \text{ and}$$

$$C_3 = Ad^3 - Ad^2.$$

wherein I represents said interpolated pixel value, S(0), S(1), S(2), S(3) represent said pixel values of said source image pixels, and wherein $C_0$, $C_1$, $C_2$ and $C_3$ represent said coefficients, wherein said distance between said source image pixels S(0), S(1), S(2), and S(3) are 1+d, d, 1−d, and 2−d, respectively, wherein d represents said reference distance, and wherein A is a predefined sharpness factor and wherein d is said reference distance.

* * * * *

UNITED STATES PATENT AND TRADEMARK OFFICE
CERTIFICATE OF CORRECTION

PATENT NO.    : 5,930,407
DATED         : July 27, 1999
INVENTOR(S)   : Philip E. Jensen It is certified that error appears in the above-identified patent and that said Letters Patent is hereby corrected as shown below:

Column 13,
Line 22, "step b)(1)" should read -- step (b)(1) --
Line 32, "$C_0=Ad^3-2Ad2+Ad$" should read -- $C_0=Ad^3-2Ad^2+Ad$ --

Line 34, "$C_1=(A+2)d_1^3-(A+3)d_1^2+1$" should read -- $C_1=(A+2)d^3-(A+3)d^2+1$ --

Line 36, "and" should be deleted at the end of the equation
Line 38, insert -- and -- at the end of the equation
Line 39, "(2)" should read -- (b) --

Column 14,
Line 61, "claims" should read -- claim --

Column 15,
Line 4, delete the comma "," at the end of the equation

Line 21, "$C_x=(A+2)ld_n^{13}-(A+3)ld_n^{12}+1$ for $0 \leq ld_n K1$" should read
-- $C_x=(A+2)|d_n|^3-(A+3)|d_n|^2+1$ for $0 \leq |d_n| < 1$ --

Line 23, "$C_x=Ald_n^{13}-5Ald_n^{12}+8Ald_n]-4A$ for $1 \leq ld_n K2$" should read
-- $C_x=A|d_n|^3-5A|d_n|^2+8A|d_n|-4A$ for $1 \leq |d_n| < 2$ --

Line 25, "$C_x = 0$ for $2 \leq ld_{n1}$" should read -- $C_x = 0$ for $2 \leq |d_n|$ --

Line 33, "$C_0=Ad^3-2Ad2+Ad$;" should read -- $C_0 = Ad^3-2Ad^2+Ad$; --

Line 35, "$C_1=(A+2)d_1^3-(A+3)d_1^2+1$;" should read -- $C_1=(A+2)d^3-(A+3)d^2+1$; --

Line 37, "$C_2 = -(A+2)d^3 + (2A+3)d^2$; and" should read
-- $C_2 = -(A+2)d^3 + (2A+3)d^2 - Ad$; and --

Column 16,
Line 19, "$C_x=(A+2)ld_n^{13} - (A+3)ld_n^{12} +1$ for $0 \leq ld_n K1$" should read
-- $C_x=(A+2)|d_n|^3 - (A+3)|d_n|^2 +1$ for $0 \leq |d_n| < 1$ --

Line 21, "$C_x=Ald_n^{13}-5Ald_n^{12}+8Ald_n]-4A$ for $1 \leq ld_n K2$" should read
-- $C_x=A|d_n|^3-5A|d_n|^2+8A|d_n|-4A$ for $1 \leq |d_n| < 2$ --

UNITED STATES PATENT AND TRADEMARK OFFICE
CERTIFICATE OF CORRECTION

PATENT NO. : 5,930,407
DATED : July 27, 1999
INVENTOR(S) : Philip E. Jensen

It is certified that error appears in the above-identified patent and that said Letters Patent is hereby corrected as shown below:

Column 16,

Line 23, "$C_x=0$ for $2 \leq ld_{ni}$" should read -- $C_x=0$ for $2 \leq |d_n|$ --

Line 30, "$C_0=Ad^3-2Ad2+Ad;$" should read -- $C_0=Ad^3-2Ad^2+Ad;$ --

Line 32, "$C_1=(A+2)d_1^3-(A+3)d_1^2+1;$" should read -- $C_1=(A+2)d^3-(A+3)d^2+1;$ --

Line 34, "$C_2 = -(A+2)d^3 + (2A+3)d^2;$ and" should read
-- $C_2 = -(A+2)d^3 + (2A+3)d^2 - Ad;$ and --

Line 43, delete the comma "," at the end of the equation
Line 56, "where in" should read -- wherein --

Line 57, "$C_x=(A+2)ld_n^{13}31 (A+3)ld_n^{12}+1$ for $0 \leq ld_n K1$" should read
-- $C_x=(A+2)|d_n|^3 - (A+3)|d_n|^2+1$ for $0 \leq |d_n| <1$ --

Line 59, "$C_x=Ald_n^{13} - 5Ald_n^{12}+8Ald_n 1-4A$ for $\leq ld_n K1$" should read
-- $C_x=A|d_n|^3 - 5A|d_n|^2+8A|d_n|-4A$ for $1 \leq |d_n| <2$ Line 61, "$C_x=0$ for $2 \leq ld_{ni}$" should read -- $C_x=0$ for $2 \leq |d_n|$ --

Column 17,

Line 1, "$C_0=Ad^3-2Ad2+Ad;$" should read -- $C_0=Ad^3-2Ad^2+Ad;$ --

Line 2, "$C_1=(A+2)d_1^3-(A+3)d_1^2+1;$" should read
-- $C_1=(A+2)d^3-(A+3)d^2+1;$ --

Line 3, "$C_2+-(A+2)d^3+(2A+3)d^2;$ and" should read
-- $C_2+-(A+2)d^3+(2A+3)d^2-Ad;$ and --

Line 17, "$C_x=(A+2)ld_n^{13}31 (A+3)ld_n^{12}+1$ for $0 \leq ld_n K1$" should read
-- $C_x=(A+2)|d_n|^3 - (A+3)|dn|^2+1$ for $0 \leq |d_n| <1$ --

Line 19, "$C_x=Ald_n^{13} - 5Ald_n^{12}+8Ald_n 1-4A$ for $\leq ld_n K1$" should read
-- $C_x=A|d_n|^3 - 5A|d_n|^2+8A|d_n|-4A$ for $1 \leq |d_n| <2$ Line 21, "$C_x=0$ for $2 \leq ld_{ni}$" should read -- $C_x=0$ for $2 \leq |d_n|$ --

UNITED STATES PATENT AND TRADEMARK OFFICE
CERTIFICATE OF CORRECTION

PATENT NO.   : 5,930,407
DATED        : July 27, 1999
INVENTOR(S)  : Philip E. Jensen It is certified that error appears in the above-identified patent and that said Letters Patent is hereby corrected as shown below:

Column 17 cont'd.

Line 28, "$C_0=Ad^3-2Ad2+Ad;$" should read -- $C_0=Ad^3-2Ad^2+Ad;$ --

Line 30, "$C_1=-(A+2)d_1^3-(A+3)d_1^2+1;$" should read -- $C_1=-(A+2)d^3-(A+3)d^2+1$ Line 32, "$C_2=-(A+2)d^3+(2A+3)^{d2};$ and" should read
-- $C_2=-(A+2)d^3+(2A+3)d^2 - Ad$ --

Column 18,
Line 22, delete the comma "," at the end of the equation
Line 26, "$C_0=Ad^3-2Ad2+Ad$" should read -- $C_0=Ad^3-2Ad^2+Ad$ --

Line 28, "$C_1=(A+2)d_1^3-A+3)d_1^2+1;$" should read
-- $C_1=(A+2)d^3-A+3)d^2+1;$ --

Line 30, "$C_2=-(A+2)d^3+(2A+3)d^2;$ and" should read
-- $C_2=-(A+2)d^3+(2A+3)d^2 - Ad;$ and --

Signed and Sealed this

Twentieth Day of August, 2002

*Attest:*

*Attesting Officer*

JAMES E. ROGAN
*Director of the United States Patent and Trademark Office*